US008648966B2

(12) United States Patent
Lee et al.

(10) Patent No.: US 8,648,966 B2
(45) Date of Patent: Feb. 11, 2014

(54) TERMINAL FOR BROADCASTING AND METHOD OF CONTROLLING THE SAME

(75) Inventors: Ju Hwan Lee, Seoul (KR); Hui Won Park, Seoul (KR); Sung Joon Ahn, Seoul (KR); Hang Dong Seong, Seoul (KR)

(73) Assignee: LG Electronics Inc., Seoul (KR)

( * ) Notice: Subject to any disclaimer, the term of this patent is extended or adjusted under 35 U.S.C. 154(b) by 950 days.

(21) Appl. No.: 12/634,561

(22) Filed: Dec. 9, 2009

(65) Prior Publication Data

US 2011/0007212 A1 Jan. 13, 2011

(30) Foreign Application Priority Data

Jul. 10, 2009 (KR) .................. 10-2009-0063024

(51) Int. Cl.
*H04N 5/445* (2011.01)
(52) U.S. Cl.
USPC ........... 348/564; 348/565; 348/556; 348/563; 348/468; 348/581; 348/583; 348/590; 348/596; 715/273; 715/252; 715/781; 715/790; 715/793; 715/800
(58) Field of Classification Search
USPC ......... 348/564, 556, 563, 468, 581, 583, 590, 348/598, 565; 715/273, 252, 781, 790, 793, 715/800
See application file for complete search history.

(56) References Cited

U.S. PATENT DOCUMENTS

| | | | | |
|---|---|---|---|---|
| 7,028,264 B2 * | 4/2006 | Santoro et al. | ................ | 715/765 |
| 7,760,269 B2 * | 7/2010 | Ochs et al. | .................... | 348/556 |
| 7,823,080 B2 * | 10/2010 | Miyajima et al. | ............. | 715/792 |
| 7,987,431 B2 * | 7/2011 | Santoro et al. | ................ | 715/765 |
| 8,117,564 B2 * | 2/2012 | Woods et al. | ................. | 715/850 |
| 8,462,123 B1 * | 6/2013 | Sears | ............................ | 345/173 |
| 2004/0107439 A1 * | 6/2004 | Hassell et al. | .................. | 725/44 |
| 2005/0283734 A1 * | 12/2005 | Santoro et al. | ................ | 715/765 |
| 2006/0020904 A1 | 1/2006 | Aaltonen et al. | | |
| 2008/0084503 A1 * | 4/2008 | Kondo | .......................... | 348/556 |
| 2008/0138033 A1 * | 6/2008 | Rodriguez et al. | ............. | 386/92 |
| 2009/0089668 A1 | 4/2009 | Magnani et al. | | |
| 2009/0093300 A1 * | 4/2009 | Lutnick et al. | .................. | 463/26 |
| 2009/0327893 A1 * | 12/2009 | Terry et al. | ................... | 715/719 |

FOREIGN PATENT DOCUMENTS

| | | |
|---|---|---|
| KR | 10-2008-0023891 A | 3/2008 |
| KR | 10-2009-0044506 A | 5/2009 |
| KR | 10-2010-0052203 A | 5/2010 |
| KR | 10-2010-0054297 A | 5/2010 |

* cited by examiner

*Primary Examiner* — Jefferey Harold
*Assistant Examiner* — Mustafizur Rahman
(74) *Attorney, Agent, or Firm* — Birch, Stewart, Kolasch & Birch, LLP

(57) ABSTRACT

A terminal including a communication unit configured to receive a broadcasting signal, a display unit configured to display a broadcast content included in the received broadcasting signal and to display at least one widget application, and a control unit configured to determine if the received broadcasting signal includes a caption related to the broadcast content, to determine if the caption is to be displayed at a position that will overlap with at least a portion of the displayed widget application when the caption is included in the broadcasting signal, and to move a position of the widget application on the display unit if the caption is determined to be displayed at the position that will overlap with said at least the portion of the displayed widget application.

18 Claims, 17 Drawing Sheets

Fig. 5
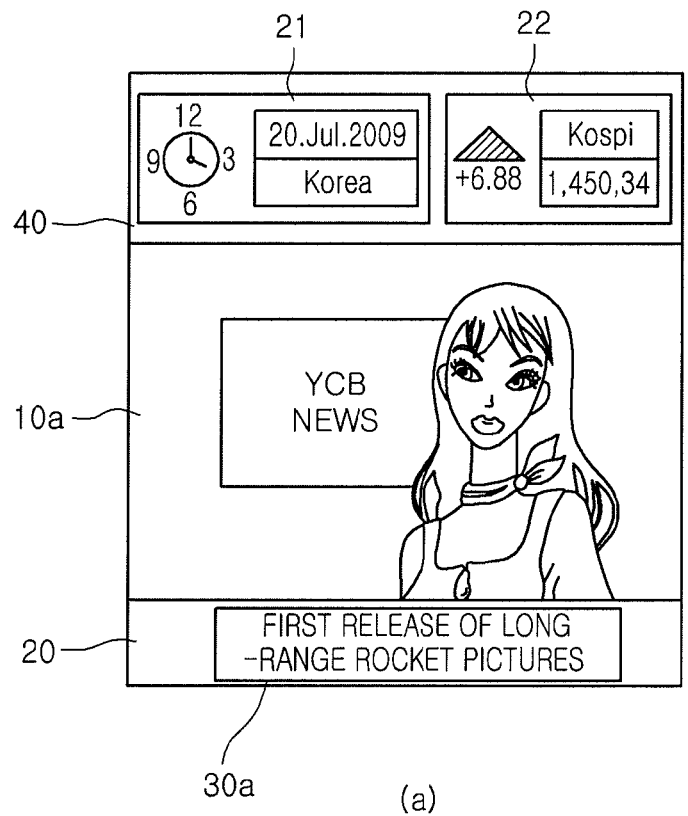
(a)
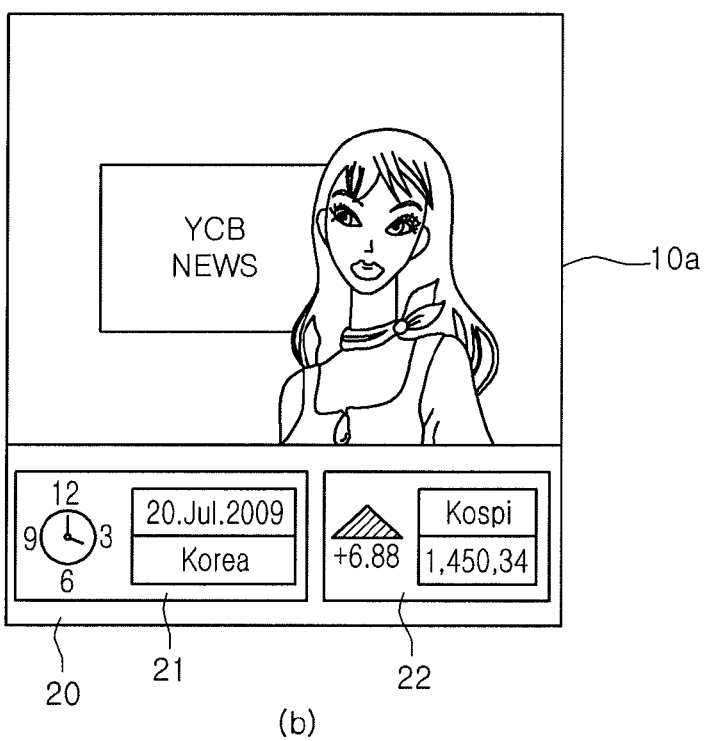
(b)

Fig. 6
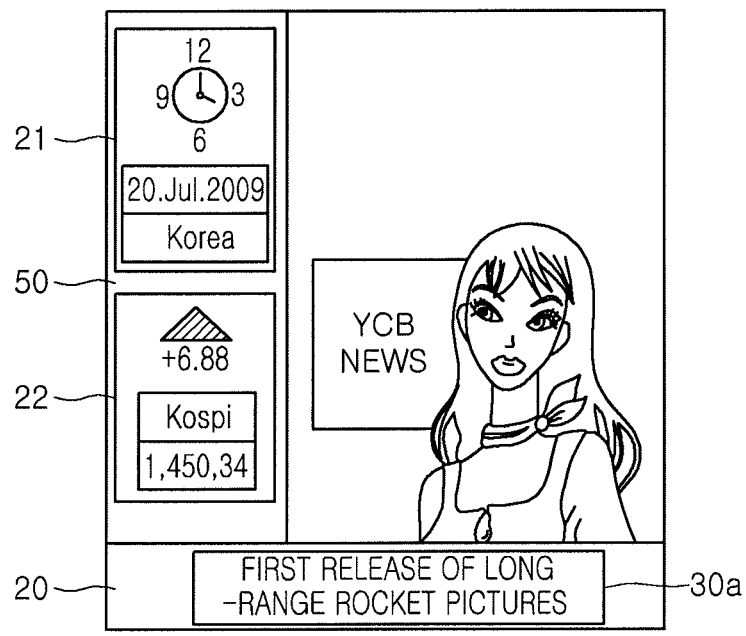
(a)
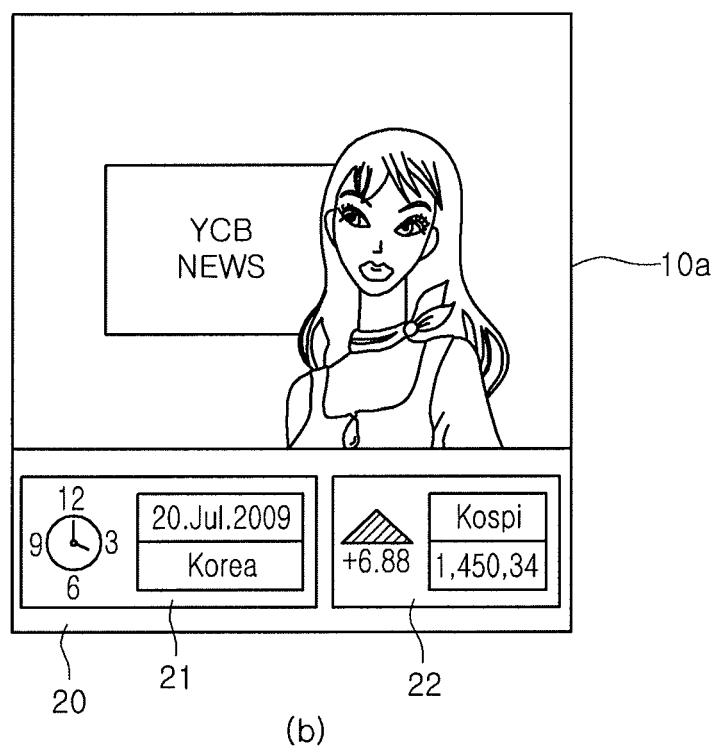
(b)

Fig. 7
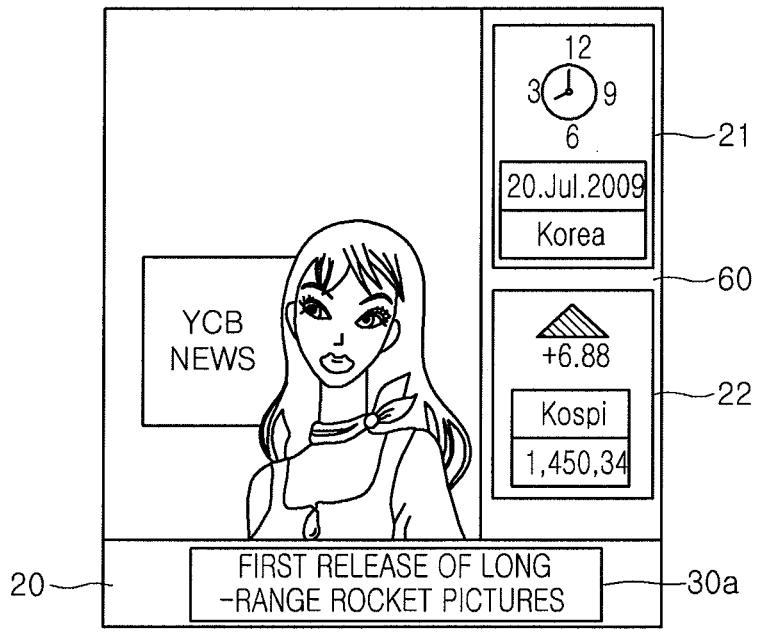
(a)
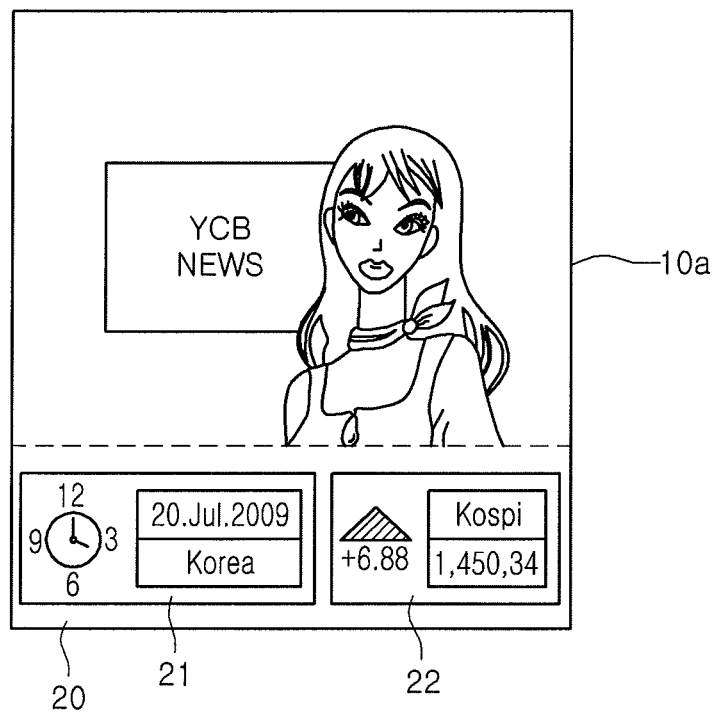
(b)

Fig. 8
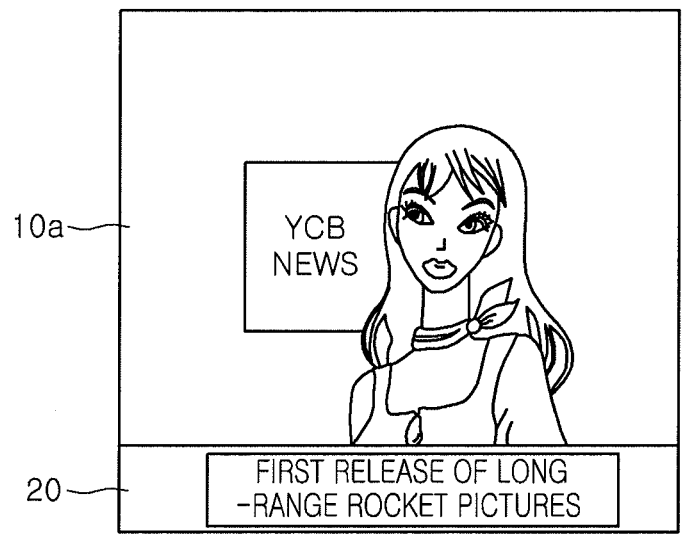
(a)
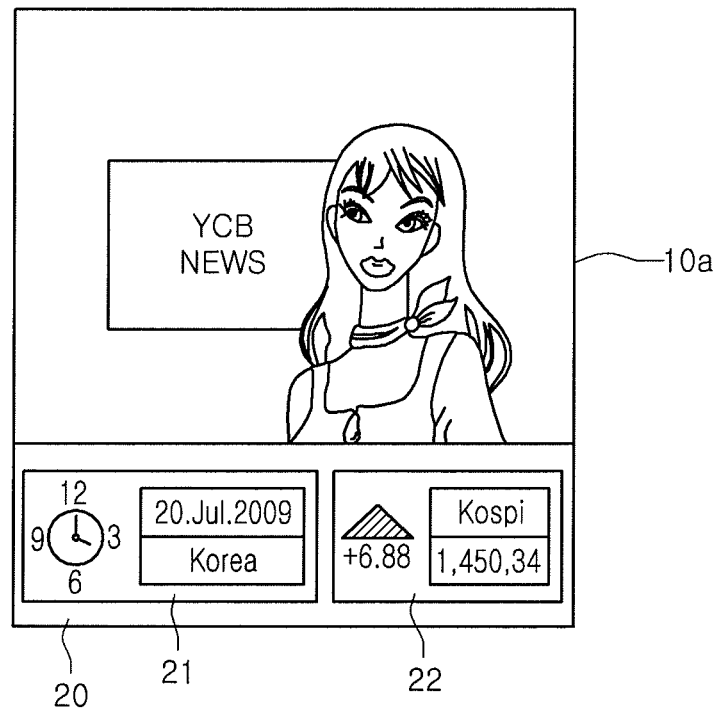
(b)

Fig. 9
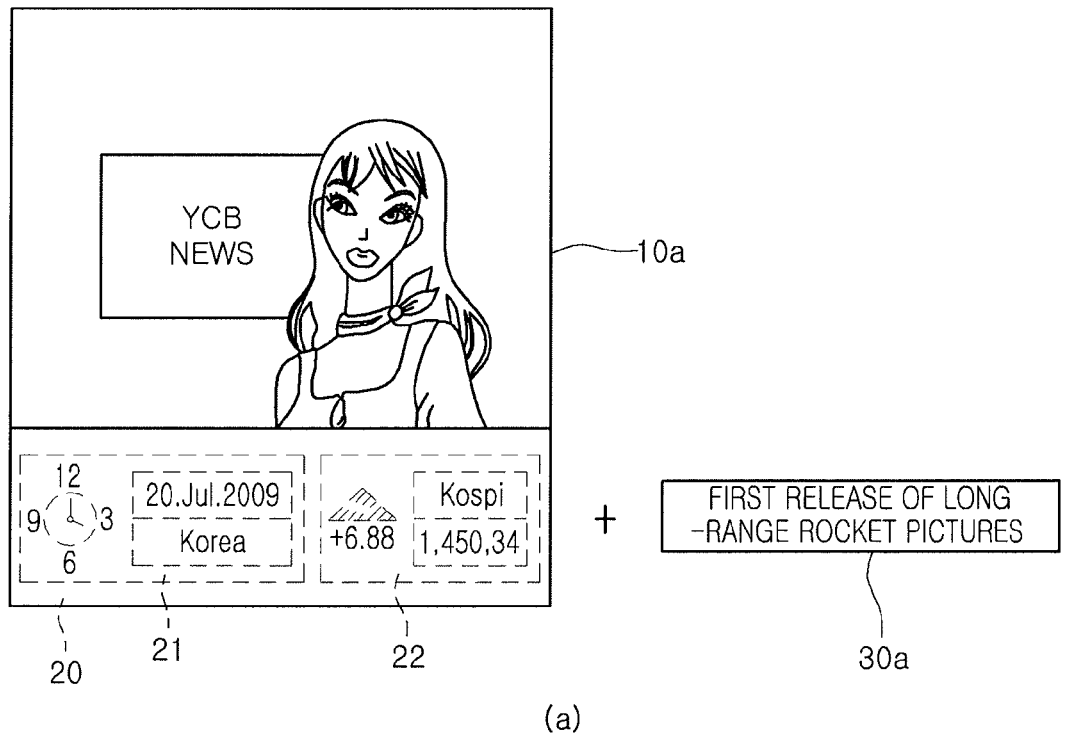
(a)
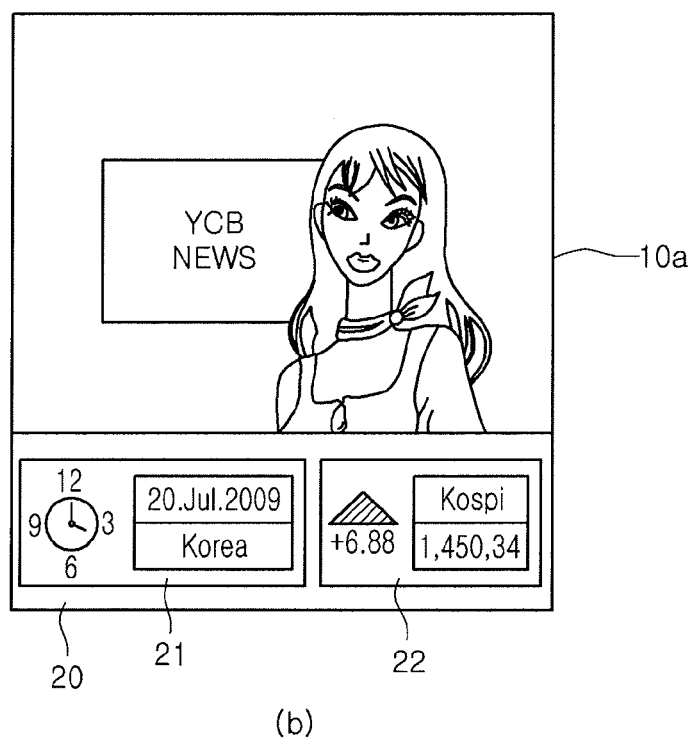
(b)

Fig. 12
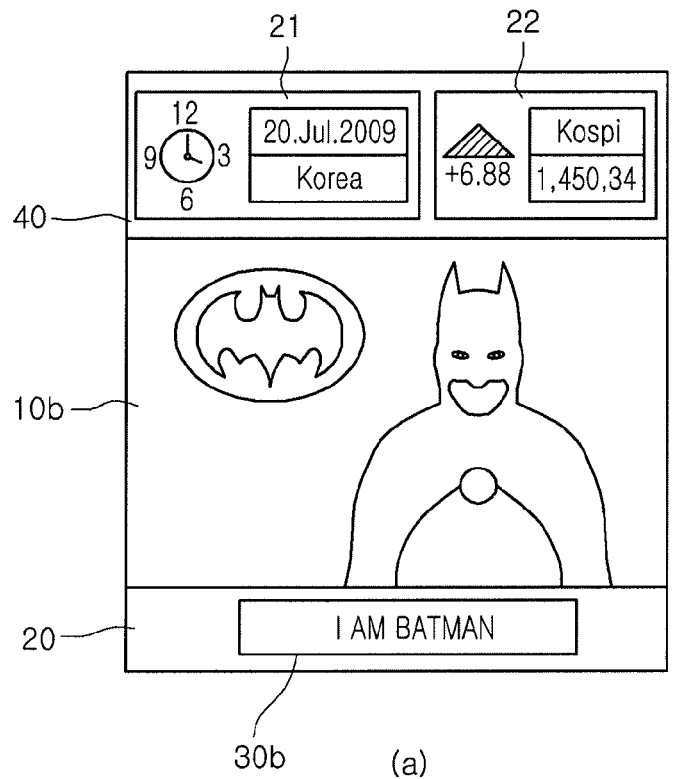
(a)
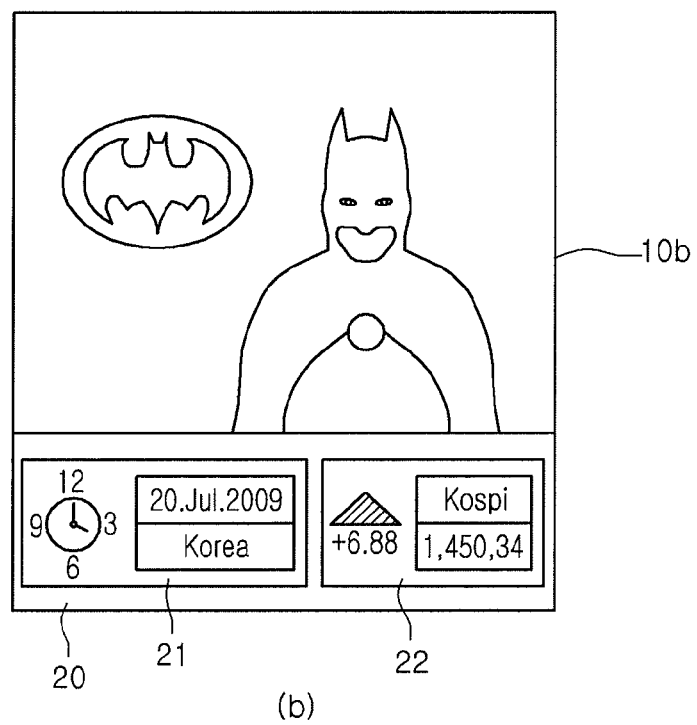
(b)

Fig. 13
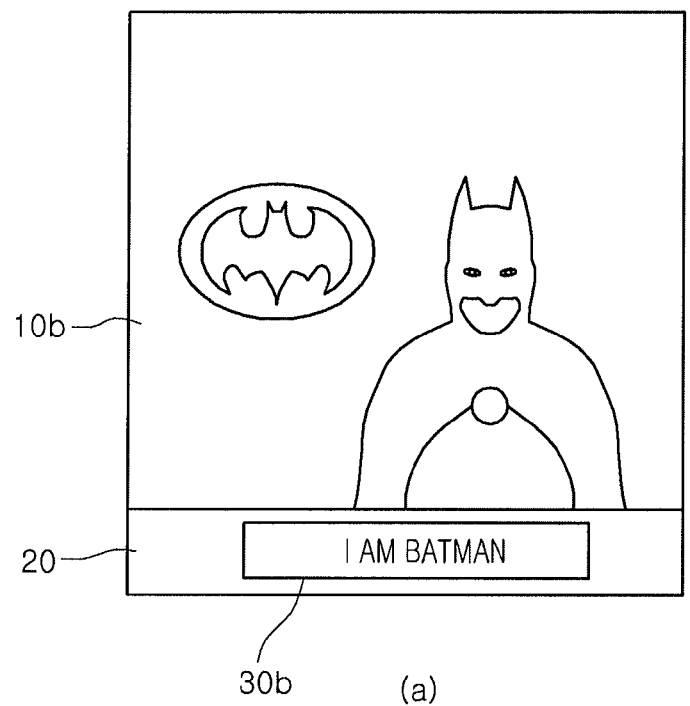
(a)
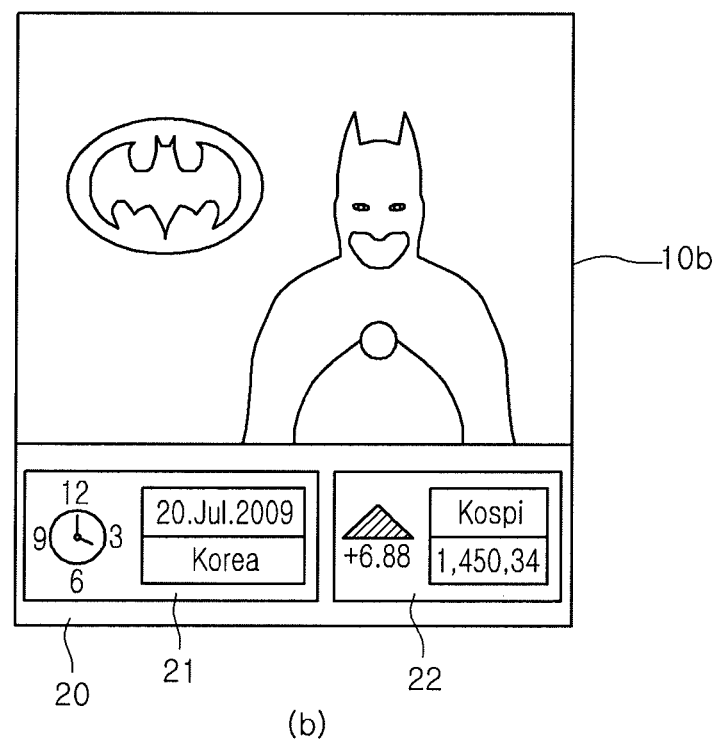
(b)

Fig. 14
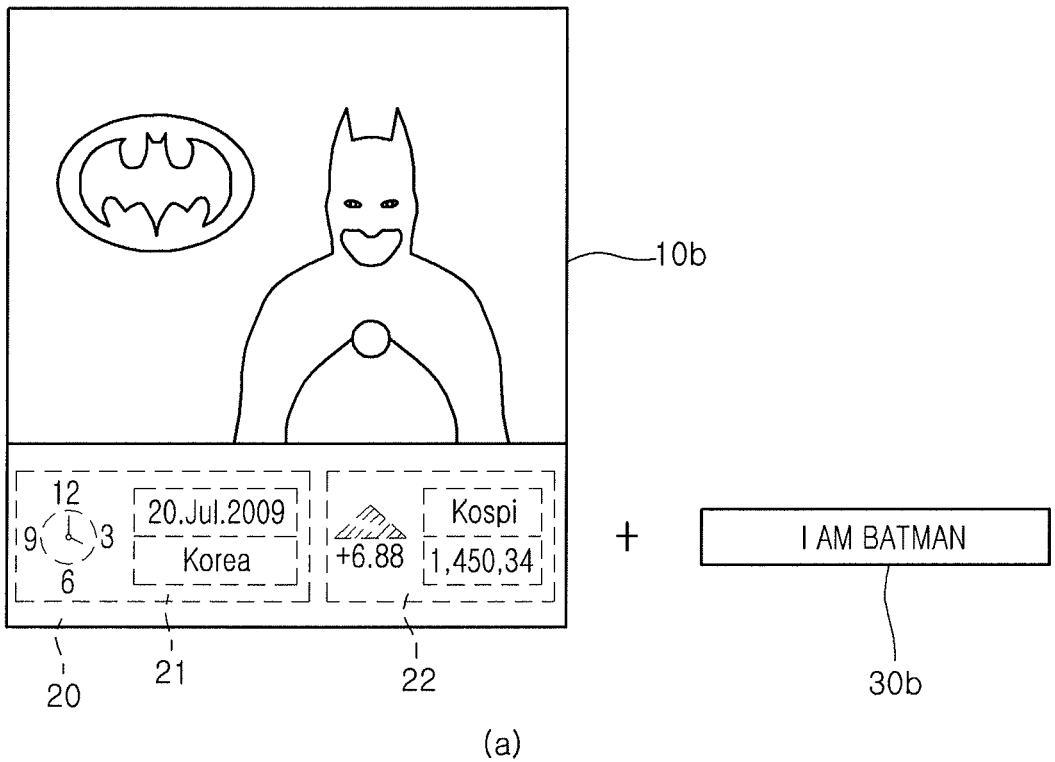
(a)
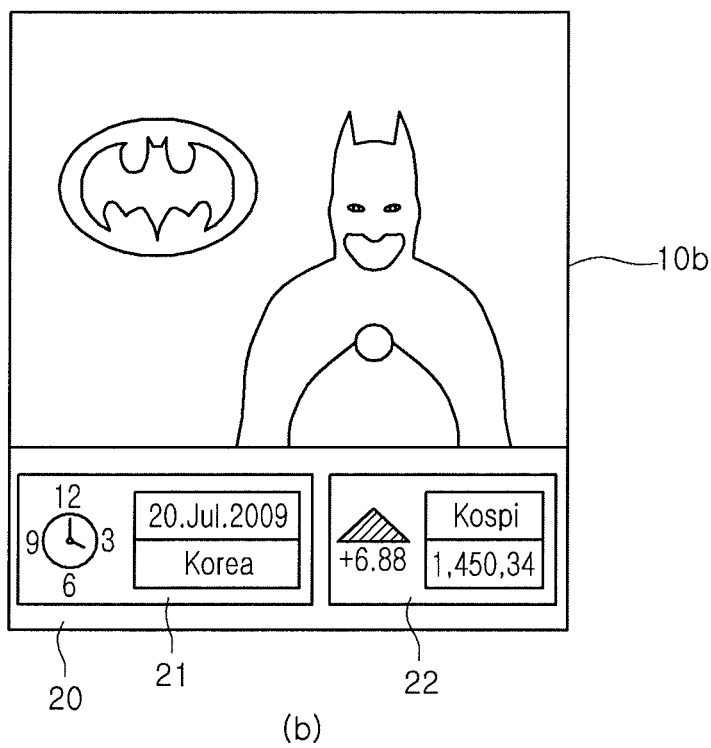
(b)

TERMINAL FOR BROADCASTING AND METHOD OF CONTROLLING THE SAME

CROSS-REFERENCE TO A RELATED APPLICATION

The present application claims priority under 35 U.S.C. 119 and 35 U.S.C. 365 to Korean Patent Application No. 10-2009-0063024 filed on Jul. 10, 2009, which is hereby incorporated by reference in its entirety.

BACKGROUND OF THE INVENTION

1. Field of the Invention

The present disclosure relates to a broadcasting terminal and corresponding method of controlling the terminal for receiving and playing broadcasting contents.

2. Discussion of the Background

Many mobile terminals are now able to access and view a variety of broadcasting programs. In particular, the mobile terminals use broadcasting systems such as the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the Internet Protocol Television (IPTV) system.

Thus, users can now view broadcast programs such as sporting events, television programs, etc. and also receive broadcasting data such as weather reports, traffic information, etc. However, the user interface for accessing broadcast programs is limited in nature, making it cumbersome and time consuming for users to access the variety of different broadcasted programs and data.

SUMMARY OF THE INVENTION

Accordingly, one aspect of the present invention is to address the above-noted and other problems.

The present invention provides in one aspect a terminal including a communication unit configured to receive a broadcasting signal, a display unit configured to display a broadcast content included in the received broadcasting signal and to display at least one widget application, and a control unit configured to determine if the received broadcasting signal includes a caption related to the broadcast content, to determine if the caption is to be displayed at a position that will overlap with at least a portion of the displayed widget application when the caption is included in the broadcasting signal, and to move a position of the widget application on the display unit if the caption is determined to be displayed at the position that will overlap with the at least the portion of the displayed widget application. The present invention also provides a corresponding method of controlling the mobile terminal.

In another aspect, the present invention provides a terminal including a communication unit configured to receive a broadcasting signal, a display unit configured to display a broadcast content included in the received broadcasting signal, and a control unit configured to determine if at least one widget application is to be displayed on the display unit with the broadcast content, to control the display unit to divide the display unit into first and second display portions, to display the widget application in the first display portion, and to adjust the second display portion to have a same aspect ratio of the display unit before the display unit was divided into the first and second portions, and to display the broadcast content in the second display portion such that the broadcast content and the widget application do not overlap each other.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4 to 9 are overviews of display screens showing a process of controlling the widget display operation of the broadcasting terminal according to the first embodiment of the present invention;

FIGS. 11 to 14 are overviews of display screens showing a process of controlling the widget display operation of the broadcasting terminal according to the second embodiment of the present invention;

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, a broadcasting terminal according to embodiments of the present invention will be described in detail with reference to the accompanying drawings. Examples of broadcasting terminals include mobile phones, smart phones, laptop computers, desktop computers, digital TVs, Personal Digital Assistants (PDAs), Portable Multimedia Players (PMPs) and navigation terminals that can receive and play broadcasting contents.

Figure 1:
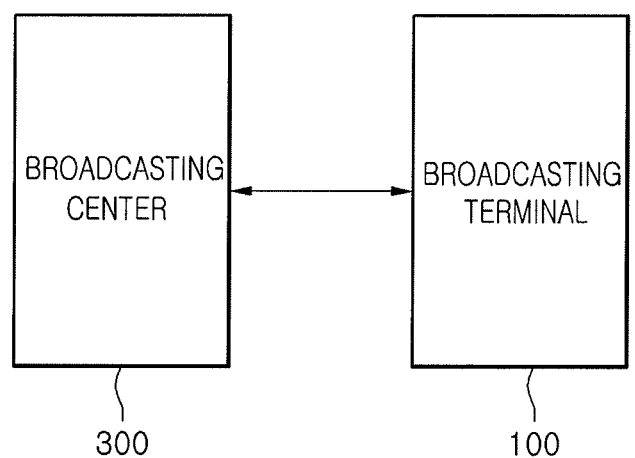
FIG. 1 is a diagram illustrating a broadcasting system according to an embodiment of the present invention.

Turning first to FIG. 1, which is a diagram illustrating a broadcasting system according to an embodiment of the present invention. As shown in FIG. 1, the broadcasting system includes a broadcasting center 300 providing broadcasting signals and a broadcasting terminal 100 receiving and playing the broadcasting signals from the broadcasting center 300.

The broadcasting system includes, for example, the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the Internet Protocol Television (IPTV) system.

Further, the broadcasting center 300 generates broadcasting signals including at least one of a caption, an image and a sound, and transmits or broadcasts the generated broadcasting signals. In addition, the broadcasting center 300 can generate broadcasting signals including position information of a caption on a screen of the broadcasting terminal 100 when the broadcasting signal includes the caption. That is, the broadcasting center 300 can send a broadcasting signal including a caption and position information of the caption on a broadcasting screen.

The broadcasting center 300 can also send a broadcasting signal including widgets that are User Interface (UI) objects providing information. The broadcasting terminal 100 then receives the broadcasting signal from the broadcasting center 300, performs a demultiplexing operation separating at least one of the caption, image and sound from the received broadcasting signal, decodes the demultiplexed caption, image and sound data, and outputs the decoded information.

Further, the broadcasting terminal 100 is configured to receive a broadcasting signal including widgets from the broadcasting center 300, and display the received widgets on a broadcasting screen or store the received widgets in a memory. Hereinafter, a configuration of the broadcasting terminal 100 according to an embodiment will be described in more detail with reference to FIG. 2.

Figure 2:
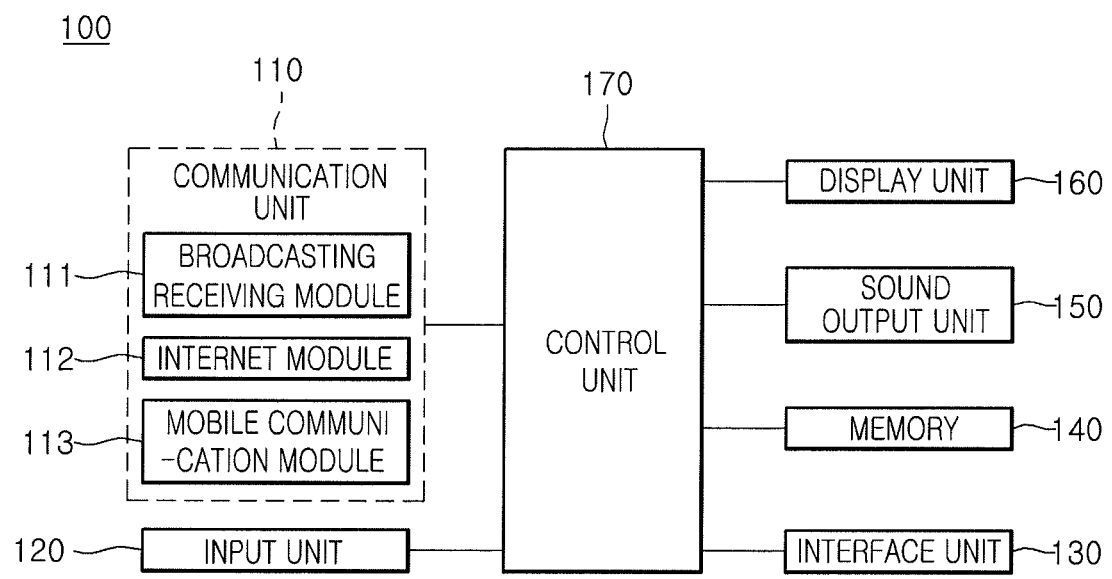
FIG. 2 is a block diagram illustrating a broadcasting terminal according to an embodiment of the present invention.

As shown in FIG. 2, the broadcasting terminal 100 includes a communicating unit 110, an input unit 120, an interface unit 130, a memory 140, a sound output unit 150, a display unit 160 and a control unit 170. The broadcasting terminal 100 may include more or less components than the components shown in FIG. 2.

In addition, the communication unit 110 includes one or more modules that enable wire/wireless communication between the broadcasting terminal 100 and the broadcasting center 300, or the broadcasting terminal 100 and a network including an external Internet server. For example, the communication unit 110 includes a broadcasting receiving module 111, an Internet module 112 and a mobile communication module 113.

The broadcasting receiving module 111 receives a broadcasting signal and/or broadcasting-related information from the broadcasting center 300 through a broadcasting channel, and demultiplexes and decodes the received broadcasting signal such that the information can be output. In addition, the broadcasting channel may include satellite channels and terrestrial channels. A broadcasting management server also corresponds to a server generating and transmitting a broadcasting signal and/or broadcasting-related information, or a server receiving and transmitting the generated broadcasting signal and/or broadcasting-related information to a terminal.

The broadcasting signal may also include broadcasting signals of a combination type in which a data broadcasting signal is combined with a TV broadcasting signal or a radio broadcasting signal, as well as a TV broadcasting signal, a radio broadcasting signal and a data broadcasting signal. Further, the broadcasting-related information corresponds to information related to broadcasting channels, broadcasting programs or broadcasting service providers. The broadcasting-related information can also be provided through a mobile communication network. In this instance, the broadcasting-related information can be received through the mobile communication module 113.

Further, the broadcasting-related information may exist in various forms. For example, the broadcasting-related information may exist in the form of an Electronic Program Guide (EPG) of the Digital Multimedia Broadcasting (DMB) system or an Electronic Service Guide (ESG) of the Digital Video Broadcast-Handheld (DVB-H) system. The broadcasting receiving module 111 can also receive digital broadcasting signals using digital broadcasting systems such as the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the Internet Protocol Television (IPTV) system.

The broadcasting receiving module 111 can also be configured to be suitable for other broadcasting systems as well as the above digital broadcasting systems. The broadcasting signals and/or the broadcasting-related information received through the broadcasting receiving module 111 can also be stored in the memory 140. Further, the broadcasting receiving module 111 can receive a broadcasting signal including a caption and position information of the caption on a broadcasting screen from the broadcasting center 300, and receive at least one widget from the broadcasting center 300. The received widget can then be displayed or stored along with the caption position information in the memory 140.

In addition, the Internet module 113 is a module for wire/wireless Internet connection and may be internally or externally installed in the broadcasting terminal 100. Wireless LAN (WLAN) (Wi-Fi), Wireless broadband (Wibro), World Interoperability for Microwave Access (Wimax), and High Speed Downlink Packet Access (HSDPA) may be used as a wireless Internet technology. The Internet module 112 can also receive a broadcasting signal of IPTV standards from the broadcasting center 300 through Internet protocols, and receive at least one widget from the broadcasting center 300 and or an external Internet server.

Also, the mobile communication module 113 transmits/receives wireless signals to/from at least one of a base station, an external terminal and a server on a mobile communication network. The wireless signals may include audio call signals, video telephone call signals or various types of data according to transmission/reception of text/multimedia messages. The mobile communication module 113 can also receive at least one widget from an external service server.

In addition, the input unit 120 generates input data for controlling the operation of the broadcasting terminal 100 by a user. The input unit 130 may include a key pad, a dome switch, a touchpad (e.g., static pressure/capacitance), a jog wheel and a jog switch. Further, the interface unit 130 serves as a passage to external devices connected to the broadcasting terminal 100, and can receive data from the external devices, deliver power to respective components in the broadcasting terminal 100, and transmit data in the broadcasting terminal 100 to the external device.

For example, the interface unit 130 may include a wired/wireless headset port, an external power port, a wire Internet connection port, a wire/wireless data port, a memory card port, a USB port, an audio I/O port, a video I/O port and an earphone port. The memory 140 also stores programs for an operation of the control unit 170, and temporarily stores input/output data (for example, broadcasting programs and videos). The memory 140 may include at least one a storage medium of memories of flash memory types, hard disk types, multimedia card micro types and card types (for example, SD or XD memories), Random Access Memory (RAM), Static Random Access Memory (SRAM), Electrically Erasable Programmable Read-Only Memory (EEPROM), Programmable Read-Only Memory (PROM), magnetic memory, magnetic disk and an optical disk.

The sound output unit 150 outputs audio data in the broadcasting signal received from the broadcasting receiving module 111 or the Internet module 112 and/or outputs audio data stored in the memory 140. The sound output unit 150 can also include a receiver, a speaker and a buzzer. Further, the display unit 160 displays information processed in the broadcasting terminal 100. For example, if the broadcasting terminal 100 is in a broadcasting receiving mode, the display unit 160 can display UI objects related to the broadcast on the broadcasting screen. In this instance, the UI objects may become widgets received from the communication unit 110 or widgets stored in the memory 140.

The display unit 160 may also include at least one of Liquid Crystal Display (LCD), Thin Film Transistor-Liquid Crystal Display (TFT LCD), Organic Light-Emitting Diode (OLED), Transparent OLED (TOLED), flexible display and 3-D display. Further, when the display unit 160 and a sensor sensing the touch operation (hereinafter, referred to as a "touch sensor") have a mutual layer structure (hereinafter, referred to as a "touch screen"), the display unit 160 can be used as an input device as well as an output device. The touch sensor can also have forms of, for example, a touch film, a touch sheet and a touch pad.

In addition, the touch sensor may be configured to convert changes of pressure or electrostatic capacity generated in a specific spot of the display unit 160 into an electrical input signal. The touch sensor can also detect a touch pressure as well as a touched position and a touched area. Further, when there is a touch input with respect to the touch sensor, signals corresponding to the touch input are sent to a touch controller. The touch controller then processes the signals and transmits the corresponding data to the control unit 170. Thus, the control unit 170 can determine which spot on the display unit 160 was touched.

In addition, the control unit 170 controls the overall operations of the broadcasting terminal 100. For example, the control unit 170 controls processes related to playing a broadcast, data communication, playing a video, etc. In addition, various embodiments set forth herein may be implemented in readable media by computers or other devices similar thereto using software, hardware or a combination thereof.

If implemented by hardware, embodiments may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors and other electrical units for performing functions. Embodiments set forth herein may be implemented within the control unit 170.

If implemented by software, embodiments having procedures and functions set forth herein may be implemented by separate software modules. The software modules may perform one or more function and operations set forth herein. Software codes may be implemented in a software application that is written in appropriate programming languages. The software codes may be stored in the memory 140 and be executed by the control unit 170.

Hereinafter, respective embodiments will be described in detail with reference the accompanying drawings.

A first embodiment of the present invention controls display operations of widgets so as to allow a user to easily identify broadcasting captions when the broadcasting captions are displayed on a position where widgets are displayed on a broadcasting screen. In more detail, FIG. 3 is a flowchart illustrating a method of controlling a widget display operation of a broadcasting terminal according to the first embodiment of the present invention.

Figure 3:
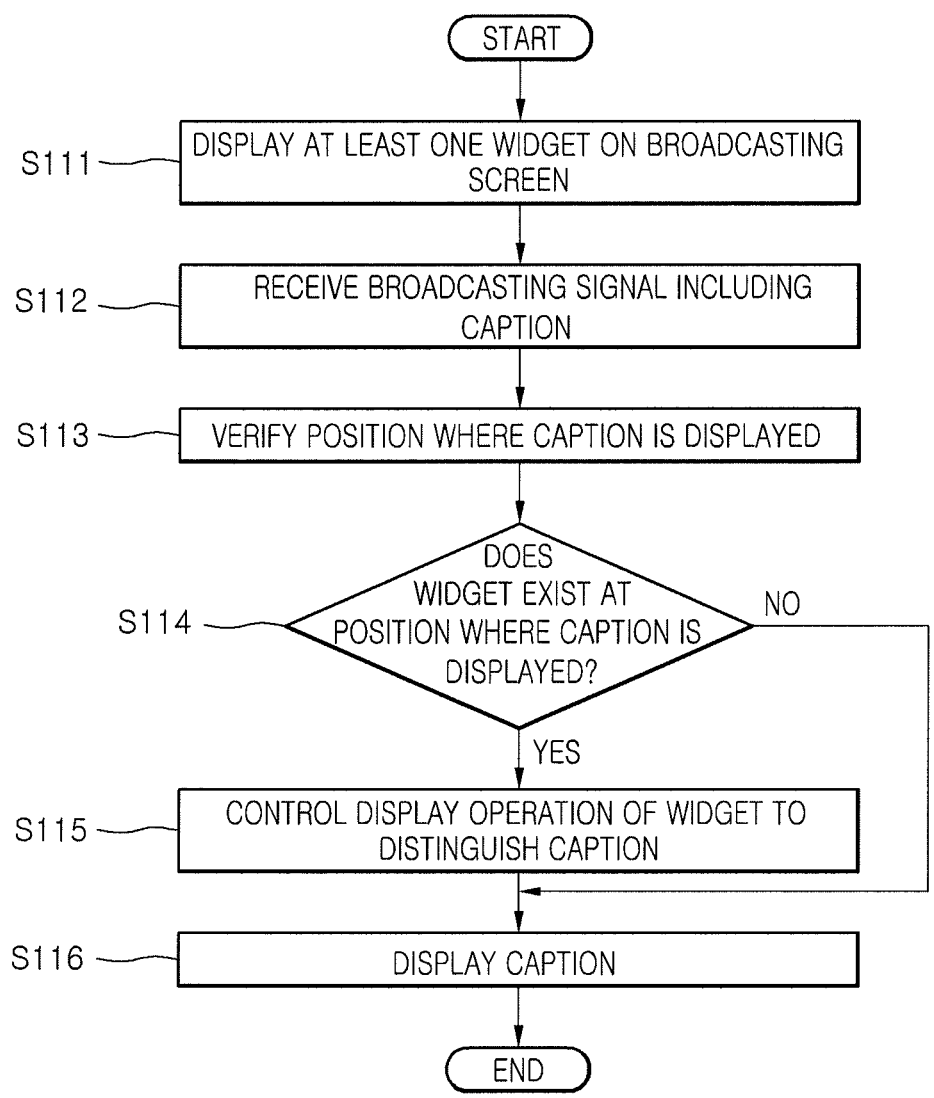
FIG. 3 is a flowchart illustrating a method of controlling a widget display operation of a broadcasting terminal according to a first embodiment of the present invention.

As shown in FIG. 3, the control unit 170 of the broadcasting terminal 100 displays widgets in a predetermined region on a broadcasting screen when a user inputs a key signal through the input unit 120 (S111). The broadcasting signal can be received from the broadcasting receiving module 111 or the Internet module 112 and the contents included in the signal are displayed on the screen of the display unit 160. Examples of the widgets, which are software applications that provide information on a broadcasting screen, include weather information widgets, stock information widgets, time information widgets, sport scores information widgets, etc.

In addition, the widgets can be displayed at one edge region on the broadcasting screen as a default, and can be moved according to a user's manipulation. Further, the widgets can be pre-stored in the memory 140, or be downloaded from an external server through the communication unit 110 and then be stored in the memory 140.

The broadcasting signal also includes a caption to be displayed with the broadcast contents while the widgets are displayed on the broadcasting screen (S112). The control unit 170 then verifies a position on the broadcasting screen where the caption will be displayed (S113). The received broadcasting signal also includes information representing a position on the broadcasting screen where the caption is to be displayed.

The control unit 170 then verifies whether the widgets exist at the position where the caption is displayed (S114). That is, the control unit 170 analyzes the position information included in the received broadcasting signal, and verifies whether the widgets exist in the display position of the caption. Thus, the control unit 170 determines or finds the predetermined display position of the received caption, and verifies whether the widgets exist in the predetermined display position of the caption.

In addition, when a caption is received, the control unit 170 checks whether a color of a predetermined range of the position where the widgets are displayed is changed. If result of the check shows that the color value is changed, the control unit 170 can determine that the received caption is displayed at the position where the widgets are displayed.

For example, if the background color of the received caption is blue, and the color on the display position of the widgets is changed within a range of red:green:blue=0~3: 0~88:255, then the control unit 170 determines that a caption of the blue background color is displayed on the display position of the widgets. As described above, if the widgets exist in a position where the received caption will be displayed (Yes in S114), the control unit 170 controls the display operations of the widgets to allow the received caption to be recognized on the broadcasting screen (S115) and displays the caption (S116).

Next, the method of controlling a widget display operation of the control unit 170 will be described in more detail with reference to FIGS. 4 to 9. In particular, FIGS. 4 to are overviews of display screens illustrating the method of controlling the widget display operation of the broadcasting terminal according to the first embodiment of the present invention.

Figure 4:
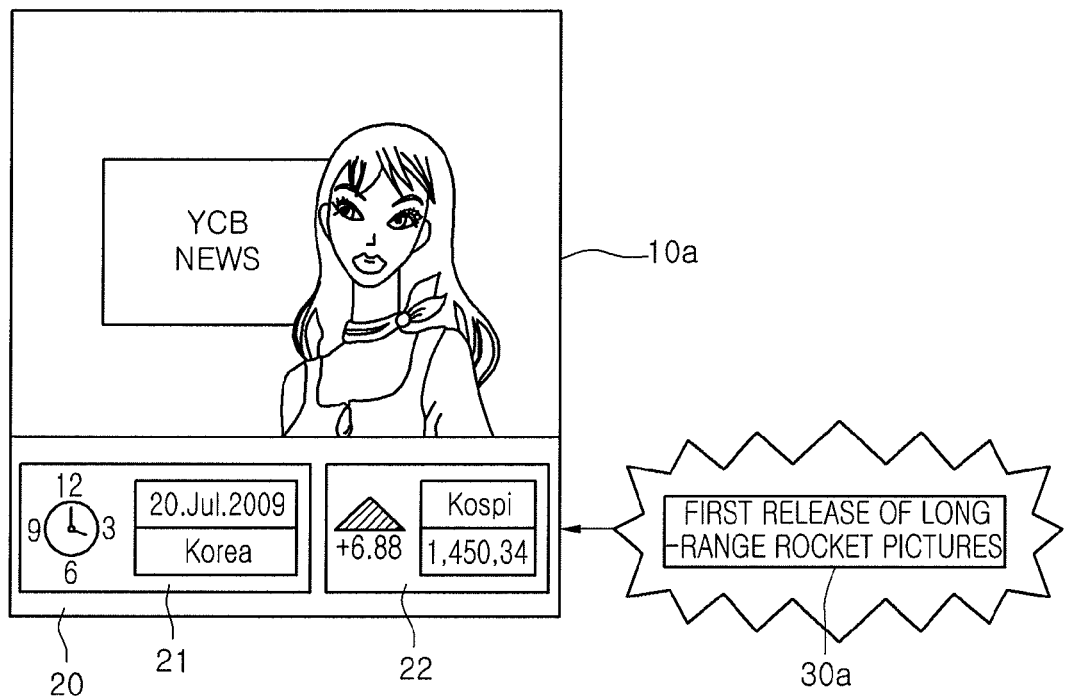

Referring to FIG. 4, the control unit 170 displays predetermined widgets 21 and 22 in a predetermined region 20 of a broadcasting screen 10a when the user inputs a key signal via the input unit 120 so as to display the widgets 21 and 22 on the broadcasting screen 10a. As shown in FIG. 4, a broadcast is also being received through the broadcasting receiving module 111 or the Internet module 112 (e.g., YCB news in this example).

Further, in the example shown in FIG. 4, the first widget 21 provides time information and the second widget 22 provides stock information and are displayed on the lower region 20 of edge regions of the broadcasting screen 10a. As discussed above, the first and second widgets 21 and 22 can also be moved on the broadcasting screen 10a according to a user's manipulation, and are displayed on a default predetermined region of the broadcasting screen 10a when displayed for the first time.

The first and second widgets 21 and 22 can also be displayed on the broadcasting screen 10a in an On Screen Display (OSD) manner, or be overlapped or transparently displayed on the broadcasting screen 10a. The transparency of the first and second widgets 21 and 22 can also be varied according to a user's manipulation. Further, when one of the first and second widgets 21 and 22 is selected, the control unit 170 controls the Internet module 112 to access an external service server linked to the selected widget, downloads detailed information related to the selected widget from the external service server, and displays the downloaded information on the broadcasting screen 10a or stores the downloaded information in the memory 140.

Further, as shown in FIG. 4, the received broadcasting signal includes a caption ("first release of long-range rocket pictures") 30a. Thus, the control unit 170 checks whether the display position of the received caption 30a is the lower region 20 where the first and second widgets 21 and 22 are displayed. If the display position of the received caption 30a is the lower region 20, as shown in FIGS. 5 to 7, the control unit 170 displays the received caption 30a on the lower region 20 of the broadcasting screen 10a, and moves the positions of the first and second widgets 21 and 22 to other regions on the broadcasting screen 10a. The caption 30a can also be scrolled from a first direction to a second direction or be displayed as a still image.

In more detail, FIG. 5(a) shows that the control unit 170 has moved the positions of the first and second widgets 21 and 22 to an upper region 40 of the broadcasting screen 10a. Further, as shown in FIG. 5(b), the control unit 170 can also move the positions of the first and second widgets 21 and 22 to the initial lower region 20 when the display of the caption 30a is completed.

In an alternative example, FIG. 6(a) shows that the control unit 170 has moved the positions of the first and second widgets 21 and 22 to a left region 50. FIG. 6(b) illustrates the control unit 170 also moving the positions of the first and second widgets 21 and 22 to the initial lower region 20 when the display of the caption 30a is completed. In yet another example, FIG. 7(a) shows that the control unit 170 has moved the positions of the first and second widgets 21 and 22 to a right region 60, and FIG. 7(b) shows that the control unit 170 moves the positions of the first and second widgets 21 and 22 to the initial lower region 20 when the display of the caption 30a is completed.

In addition, if the display position of the received caption 30a in FIG. 4 is the lower region 20 where the first and second widgets 21 and 22 are displayed, the control unit 170 can display the received caption 30a on the lower region 20 of the broadcasting screen 10a, and stop the display of the first and second widgets 21 and 22 until the display of the caption 30a is completed as shown in FIG. 8.

In more detail, FIG. 8(a) shows that the control unit 170 has displayed the received caption 30a on the lower region 20 where the first and second widgets 21 and 22 are initially displayed, and has stopped the display of the first and second widgets 21 and 22. FIG. 8(b) shows that the control unit 170 re-displays the first and second widgets 21 and 22 on the lower region 20, when the display of the caption 30a is completed.

In yet another example, the control unit 170 can display the received caption 30a and the first and second widgets 21 and 22 in an overlapping manner in the lower region 20 and change the transparency of the first and second widgets 21 and 22 to allow a user to recognize the caption 30a. In more detail, FIG. 9(a) shows that the control unit 170 displays the caption 30a and the first and second widgets 21 and 22 in an overlapping manner in the lower region 20, and has lowered the transparency of the first and second widgets 21 and 22 to a predetermined level to allow a user to recognize the caption 30a. As discussed above, the transparency of the first and second widgets 21 and 22 can be varied according to a user's manipulation.

In addition, the control unit 170 can increase the distinctiveness of the caption 30a by changing the font attributes of the caption 30a. For example, a predetermined color can be inserted into the background of the caption 30a. Alternatively, the caption 30a can be changed into a bold font or be displayed in a blinking manner. As shown in FIG. 9(b), the control unit 170 recovers the transparency of the first and second widgets 21 and 22 to the previous transparency when the display of the caption 30a is completed.

The second embodiment of the present invention controls display operations of widgets so as to allow a user to easily identify video captions when the video captions are displayed on a position where widgets are displayed. In more detail, FIG. 10 is a flowchart illustrating a method of controlling a widget display operation of a broadcasting terminal according to the second embodiment of the present invention.

Figure 10:
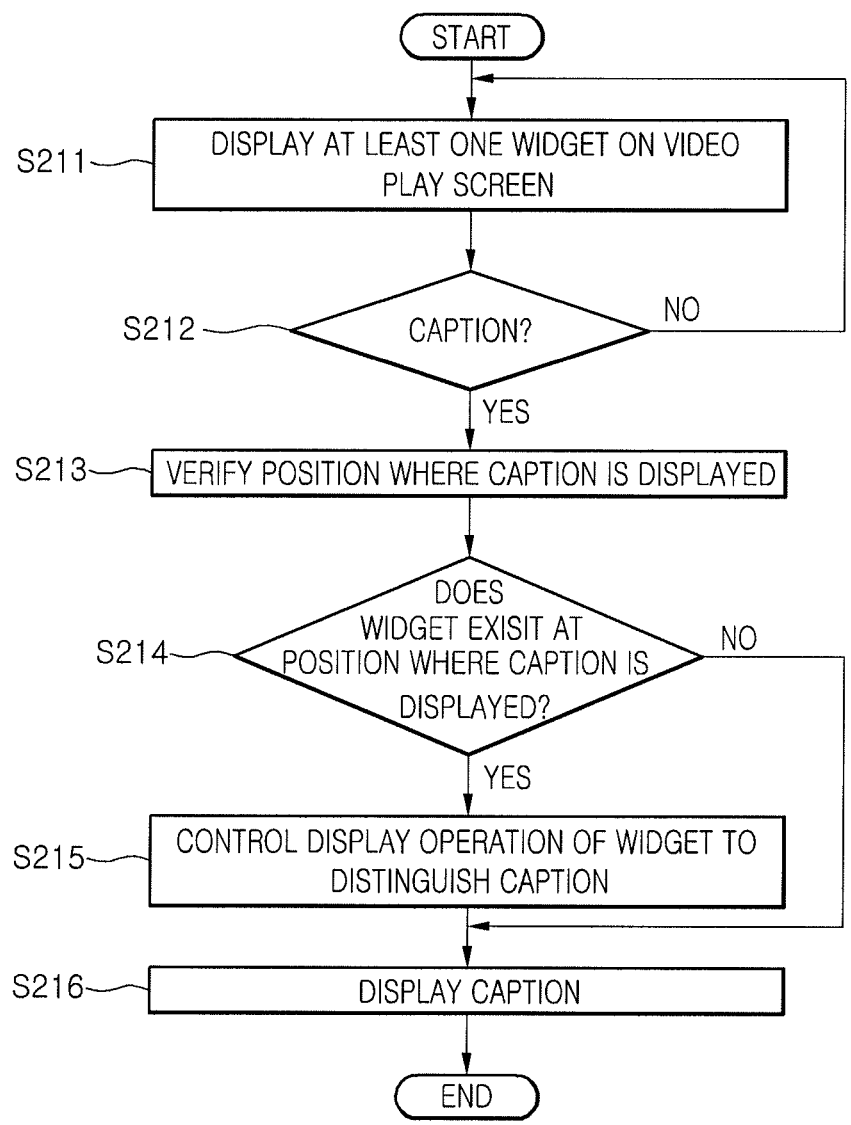
FIG. 10 is a flowchart illustrating a method of controlling a widget display operation of a broadcasting terminal according to a second embodiment of the present invention.

Referring to FIG. 10, if a video file is selected by a user through the input unit 120, the control unit 170 of the broadcasting terminal 100 drives an application to play the selected video file and plays the video file. The control unit 170 also displays widgets in a predetermined region on a video play screen if the user inputs a key signal through the input unit 120 to display the user-desired widgets (S211).

Further, the control unit 170 also verifies if there is a caption for the video being played (S212). If there is a caption to be displayed with the widgets being displayed (Yes in S212), the control unit 170 verifies a position of the video play screen where the caption will be displayed (S213).

That is, the control unit 170 finds the predetermined display position of the caption included in the video file, and verifies whether the widgets exist in the predetermined display position of the caption (S214). Further, the control unit 170 checks whether the color value of a predetermined range of the position where the widgets are displayed is changed. If a result of the check shows that the color value is changed, the control unit 170 determines that the received caption is displayed at the position where the widgets are displayed (Yes in S214).

Then, the control unit 170 displays the received caption (S216) after controlling the display operations of the widgets to allow the caption included in the video file to be recognized on the video play screen (S215). Hereinafter, a process of controlling a widget display operation of the control unit 170 will be described in detail with reference to FIGS. 11 to 14.

Figure 11:
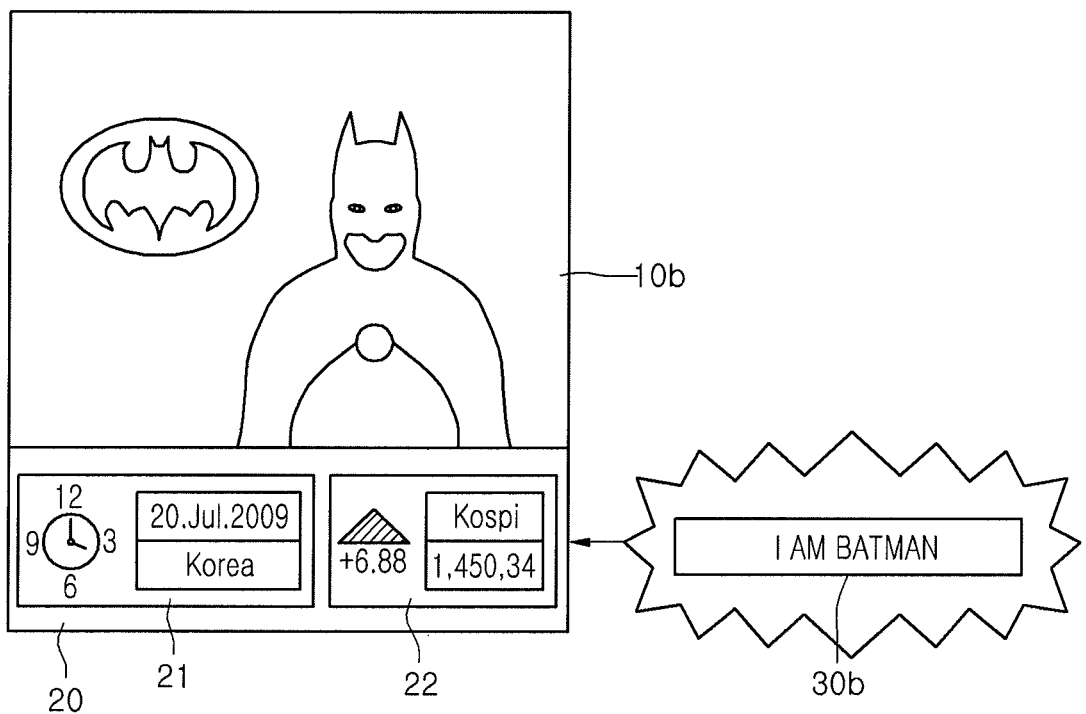

In more detail, FIGS. 11 to 14 are overviews of display screens showing a process of controlling the widget display operation of the broadcasting terminal according to the second embodiment of the present invention. Referring to FIG. 11, the control unit 170 displays the predetermined widgets 21 and 22 in the predetermined region 20 on a video play screen 10b when the user inputs a key signal through the input unit 120 to display the widgets 21 and 22 on the video play screen 10b, when the video selected by the user is also being played.

FIG. 11 also shows that the first widget 21 providing time information and the second widget 22 providing stock information are displayed on the lower region 20 of edge regions of the video play screen 10b. In addition, as discussed previously, the first and second widgets 21 and 22 can be moved on the video play screen 10b according to the user's manipulation, and are generally displayed on a predetermined default region of the video play screen 10b when displayed for the first time.

The first and second widgets 21 and 22 can also be displayed on the video play screen 10b in an On Screen Display manner, or be overlapped or transparently displayed on the video play screen 10b. The transparency of the first and second widgets 21 and 22 can be varied according to the user's manipulation. Also, if one of the first and second widgets 21 and 22 is selected, the control unit 170 controls the Internet module 112 to access an external service server linked to the selected widget, downloads detailed information related to the selected widget from the external service server, and displays the downloaded information on the video play screen 10b or stores the downloaded information in the memory 140.

As shown in FIG. 11, a caption ("I am Batman") 30b is scheduled to be displayed on the current video play screen 10b. In this instance, the control unit 170 checks whether the display position of the caption 30b is the lower region 20 where the first and second widgets 21 and 22 are displayed. If the display position of the caption 30a is the lower region 20 where the first and second widgets 21 and 22 are displayed, as shown in FIG. 12, the control unit 170 displays the caption 30b on the lower region 20 of the video play screen 10b, and moves the positions of the first and second widgets 21 and 22 to other regions on the video play screen 10b. The caption 30b can also be scrolled from a first direction to a second direction or be displayed as a still image.

In more detail, FIG. 12(a) shows that the control unit 170 has moved the positions of the first and second widgets 21 and 22 to an upper region 40 of the video play screen 10b. FIG. 12(b) illustrates the control unit 170 moving the positions of the first and second widgets 21 and 22 to the initial lower region 20 when the display of the caption 30a is completed.

The control unit 170 can also move the positions of the first and second widgets 21 and 22 to a left or right region when the display position of the caption 30b is the lower region 20 where the first and second widgets 21 and 22 are displayed. Further, as shown in FIG. 13, the control unit 170 can display the caption 30b on the lower region of the video play screen 10b and stop the display of the first and second widgets 21 and 22 until the display of the caption 30b is completed.

In particular, FIG. 13(a) shows that the control unit 170 has displayed the caption 30b on the lower region 20 where the first and second widgets 21 and 22 are initially displayed, and has stopped the display of the first and second widgets 21 and 22. As shown in FIG. 13(b), the control unit 170 can re-display the first and second widgets 21 and 22 on the lower region 20, when the display of the caption 30b is completed.

Further, as shown in FIG. 14, the control unit 170 can display the caption 30b and the first and second widgets 21 and 22 in an overlapping manner in the lower region 20 and change the transparency of the first and second widgets 21 and 22 to allow a user to recognize the caption 30b. In particular, FIG. 14(a) shows that the control unit 170 displays the caption 30b and the first and second widgets 21 and 22 in an overlapping manner in the lower region 20, and has lowered the transparency of the first and second widgets 21 and 22 to a predetermined level to allow a user to recognize the caption 30b. Further, the transparency of the first and second widgets 21 and 22 can be varied according to the user's manipulation.

The control unit 170 can also increase the distinctiveness of the caption 30b by changing the font attributes of the caption 30b. For example, a predetermined color may be inserted into the background of the caption 30b. Alternatively, the caption 30a may be changed into a bold font or be displayed to blink.

Next, the third embodiment of the present invention displays widgets not to be overlapped on a broadcasting screen when the widgets are scheduled to be displayed in an overlapping manner on the broadcasting screen and adjusts the size of the broadcasting screen to maintain the previous size of the broadcasting screen before the widgets are displayed for the first time.

Figure 15:
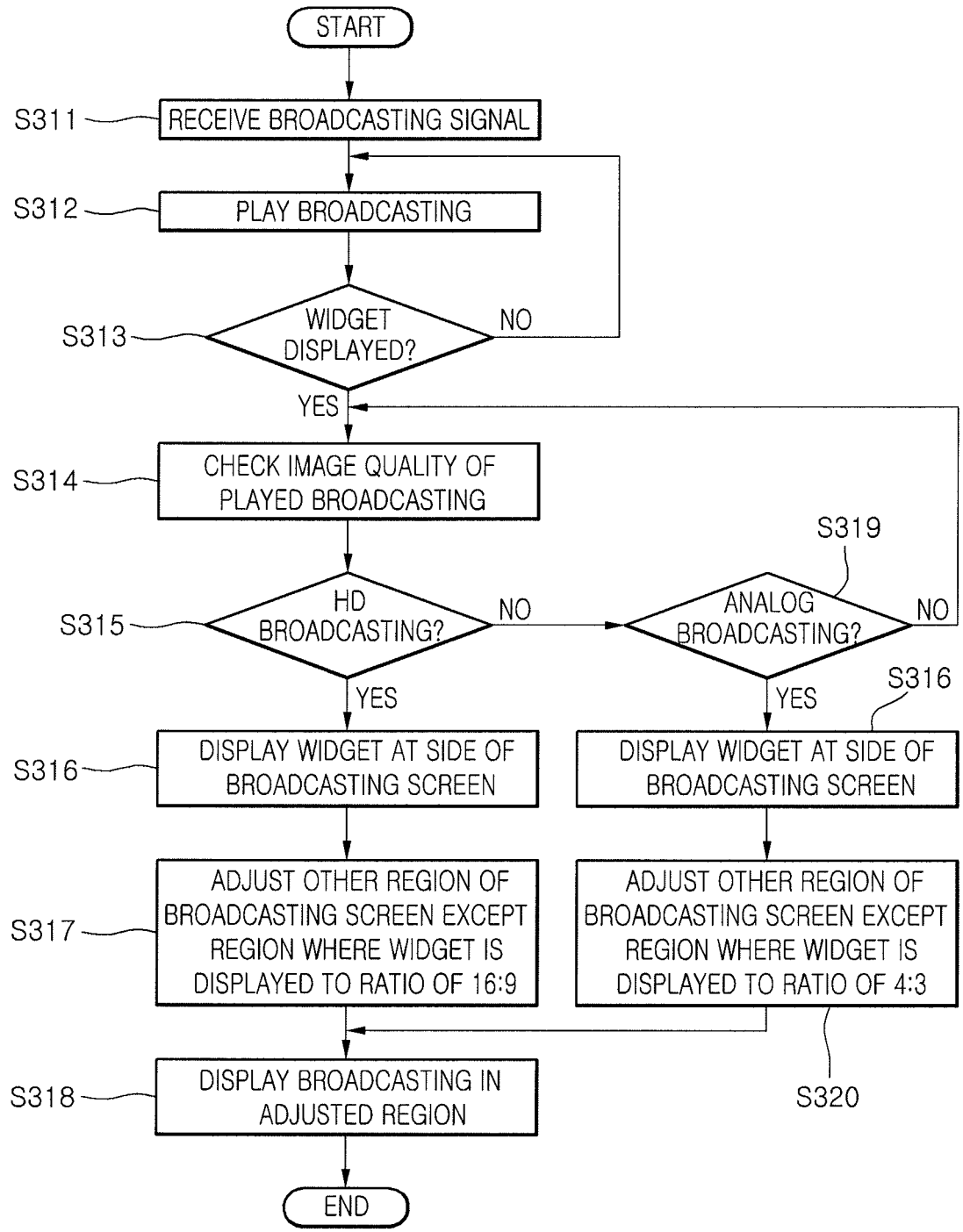
FIG. 15 is a flowchart illustrating a method for scaling a size of a broadcasting screen of a broadcasting terminal according to a third embodiment of the present invention.

Hereinafter, a process of adjusting the size of a broadcasting screen of a broadcasting terminal according to an embodiment will be described in detail with reference to flowchart in FIG. 15. Referring to FIG. 15, a broadcasting signal is received through the broadcasting module 111 or the Internet module 112 (S311). The control unit 170 then plays the received broadcast on a screen of the display unit 160 (S312).

Then, if the user inputs a key signal via the input unit 120 to display at least one widget (Yes in S313), the control unit 170 checks the image quality of the played broadcasting (S314). If the image quality of the broadcasting screen corresponds to a High-Definition (HD) broadcasting having as aspect ratio of 16:9 (Yes in S315), the control unit 170 divides the broadcasting play screen into a first region for displaying the widgets and a second region for displaying the broadcasting, and displays the widgets on the first region (S316).

After adjusting the aspect ratio of the second region to 16:9 that is a HD broadcasting aspect ratio (S317), the control unit 170 displays the broadcasting on the second region adjusted to the aspect ratio of 16:9 (S318). Also, if the image quality does not correspond to HD (No in S315), and if the image quality of the broadcasting screen corresponds to an analog broadcasting having as aspect ratio of 4:3 (Yes in S319), the broadcasting play screen is divided into a first region for displaying the widgets and a second region for displaying the broadcast.

After the widgets are displayed on the first region and the aspect ratio of the second region is adjusted to the aspect ratio of 4:3 that is an aspect ratio of an analog broadcasting (S316 and S320), the broadcast is displayed on the second region adjusted to the aspect ratio of 4:3. Further, the control unit 170 can check the image quality of the broadcasting signal received from the communication unit 110 if UI objects or widget applications are moved to a region of the broadcasting screen except a region where the caption is displayed so as not to overlap the caption.

That is, the control unit 170 can adjust the aspect ratio of other regions of the broadcasting screen except the region where the UI objects are displayed to the aspect ratio of 16:9, if the image quality of the checked broadcasting signal corresponds to an HD broadcasting, when the UI objects are moved on the broadcasting screen not to overlap the caption. The control unit 170 can also adjust the aspect ratio of other regions of the broadcasting screen except the region where the UI objects are displayed to the aspect ratio of 4:3, if the image quality of the checked broadcasting signal corresponds to an analog broadcasting, when the UI objects are moved on the broadcasting screen not to overlap the caption.

Figure 16:
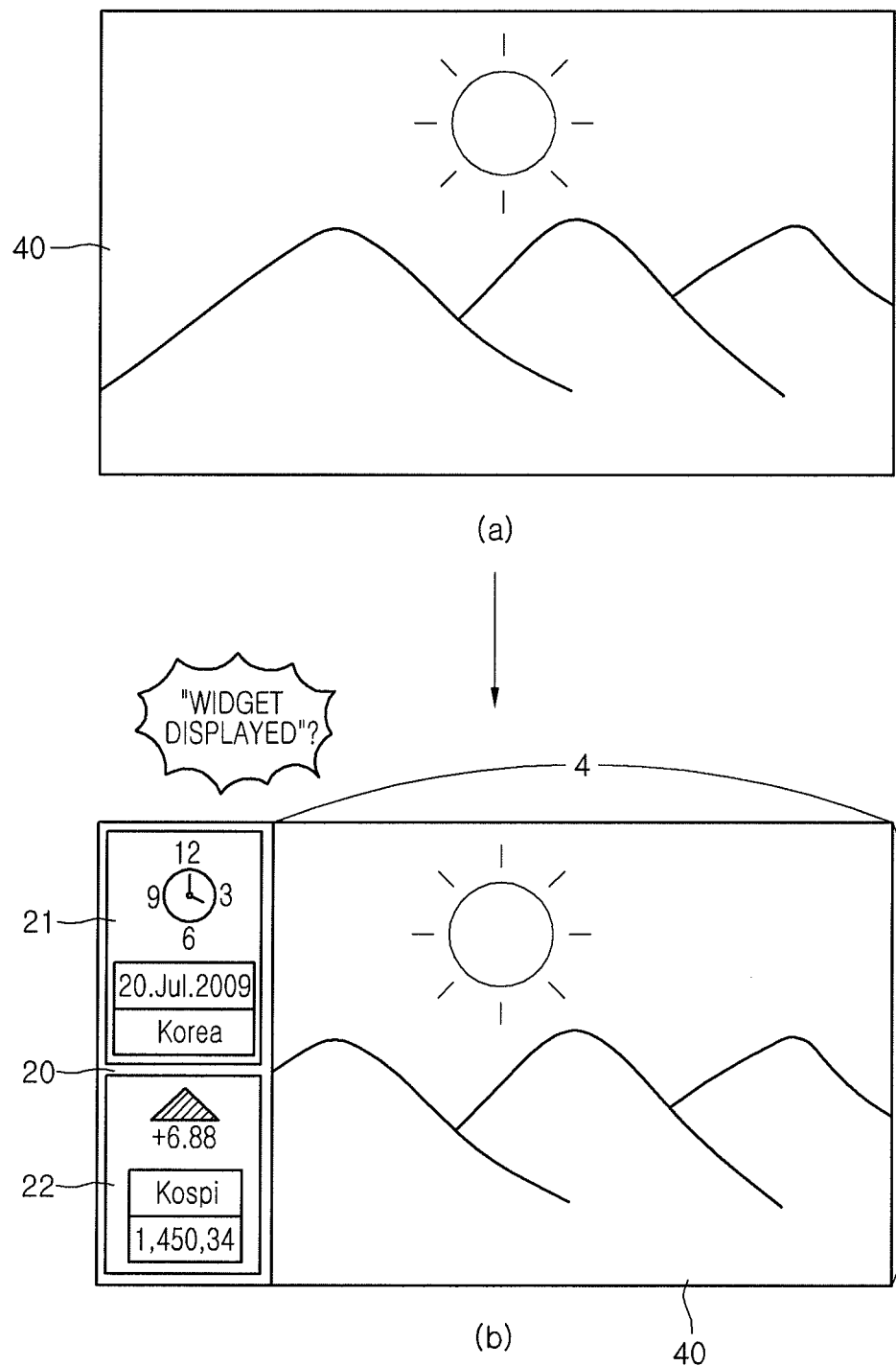
FIG. 16 is an overview of a display screen showing a process of scaling the broadcasting play screen including widgets into an aspect ratio of 4:3 according to the third embodiment of the present invention.

Next, a process of resizing the broadcasting play screen including the widgets according to the image quality will be described in more detail with reference to FIGS. 16 and 17. In more detail, FIG. 16 is an overview of a display screen showing a process of scaling a broadcasting play screen including widgets into an aspect ratio of 4:3 according to the third embodiment of the present invention. In particular, FIG. 16(*a*) illustrates a broadcasting play screen 40 showing an analog broadcasting having an aspect ratio of 4:3, which is received from the broadcasting receiving module 111 or the Internet module 112.

If the user inputs a key signal via the input unit 120 to display widgets 21 and 22, the control unit 170 divides the total screen into a first region 50 for displaying the widgets 21 and 22 and a second region 51 for displaying the broadcast as shown in FIG. 16(*b*). After the control unit 170 displays the widgets 21 and 22 on the first region 50 and adjusts the second region 51 to an aspect ratio of 4:3, the control unit 170 displays the received broadcast in the second region 51 that has been adjusted to the aspect ratio of 4:3.

Figure 17:
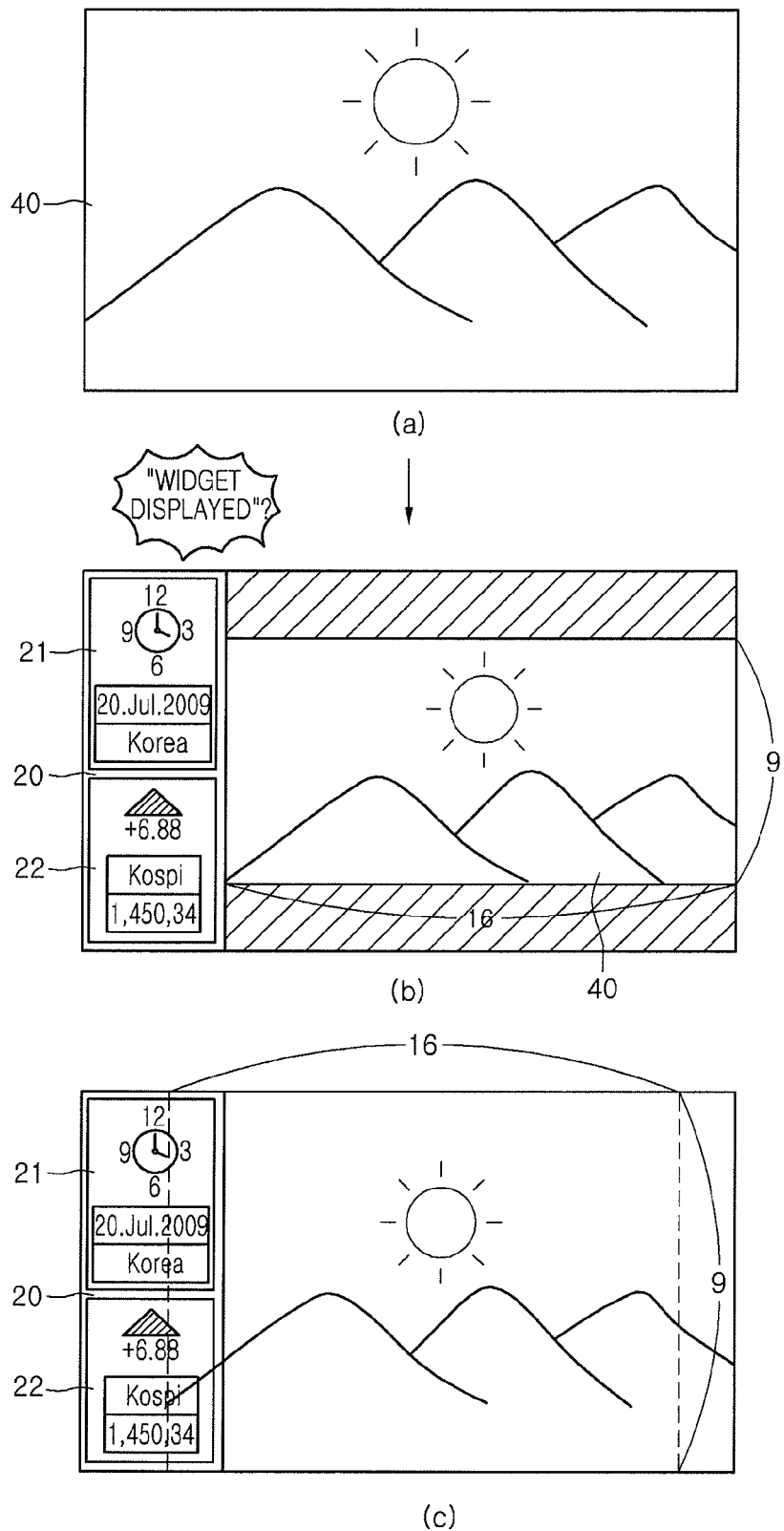
FIG. 17 is of a display screen showing a process of scaling the broadcasting play screen including widgets into an aspect ratio of 16:9 according to the third embodiment of the present invention.

Next, FIG. 17 includes overviews of display screens showing a process of scaling a broadcasting play screen including widgets into an aspect ratio of 16:9 according to the third embodiment of the present invention. In particular, FIG. 17(*a*) illustrates the broadcasting play screen 40 showing an HD broadcast having an aspect ratio of 16:9, which is received from the broadcasting receiving module 111 or the Internet module 112.

If the user inputs the key signal via the input unit 120 to display widgets 21 and 22, the control unit 170 divides the total screen into the first region 50 for displaying the widgets 21 and 22 and the second region 51 for displaying the widgets as shown in FIG. 17(*b*). After the control unit 170 displays the widgets 21 and 22 on the first region 50 and adjusts the second region 51 to an aspect ratio of 16:9, the control unit 170 displays the received broadcast in the second region 51 that has been adjusted to the aspect ratio of 16:9.

Further, as shown in FIG. 17(*b*), margins of the upper and lower ends of the second region 51 that has been adjusted to the aspect ratio of 16:9 are colored in black lines, for example. As shown in FIG. 17(*c*), the control unit 170 can display the widgets 21 and 22 in the first region 50, and display a left portion of the second region 51 in an overlapping manner with the first region 50 upon adjustment of the second region 51 to the ratio of 16:9 and cut a right portion of the second region 51 to adjust the aspect ratio of the second region 51 to 16:9.

In addition, if there are two separate display included in the terminal, embodiments of the present invention can also be applied to these types of terminal. For example, if there are widgets being displayed in a first display (e.g., a main display portion of the terminal), and the user selects a broadcast program to be displayed in the first display portion, the control unit 170 can move the widgets to a second display (e.g., a sub-display portion).

Therefore, embodiments of the present invention provide a novel a broadcasting terminal and a method of controlling the broadcasting terminal, which allow a user to easily distinguish broadcasting captions displayed on a position where widgets are displayed.

Further, the embodiments according to the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices and data transmission through the Internet. Also, the computer may include the control unit 170 of the broadcasting terminal 100.

The broadcasting terminal and the method of controlling the same set forth herein should not be construed as limited to the configurations and methods of the embodiments described above. For example, the above embodiments can be selectively combined in whole or in part to achieve various modifications thereof.

Although embodiments have been described with reference to a number of illustrative embodiments thereof, numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A terminal, comprising:
   a communication unit configured to receive a digital signal including audio, video and data signal;
   a display unit configured to display a video content included in the received digital signal and to display at least one widget application; and
   a control unit configured to determine if the received digital signal includes a caption related to the video content, to determine if the caption is to be displayed at a position that will overlap with at least a portion of the displayed widget application, and to move a position of the widget application on the display unit if the caption is determined to be displayed at the position that will overlap with said at least the portion of the displayed widget application,
   wherein the control unit is further configured to divide the display unit into first and second display portions, to display the widget application in the first display portion, and to adjust the second display portion to have a same aspect ratio of the display unit before the display unit was divided into the first and second portions, and to display the video content in the second display portion.

2. The terminal of claim 1, wherein the digital signal further comprises information representing the position that the caption is to be displayed on the display unit, and
   wherein the control unit is further configured to determine the caption is to be displayed at the position that will overlap with said at least the portion of the displayed widget application, if a color change of a predetermined range occurs at the position of the displayed widget application.

3. The terminal of claim 1, wherein the control unit is further configured to move the widget application to a previous position of the widget application after the caption is removed from being displayed.

4. The terminal of claim 1, wherein the control unit is further configured to change a transparency of the widget application if the control unit determines the caption is to be displayed at the position that will overlap with said at least the portion of the displayed widget.

5. The terminal of claim 1, wherein the control unit is further configured to adjust the aspect ratio of the second display portion to a ratio of 16:9 if the digital signal is a High-Definition (HD) broadcasting signal.

6. The terminal of claim 1, wherein the control unit is further configured to adjust the aspect ratio of the second display portion to a ratio of 4:3 if the digital signal is an analog broadcasting signal.

7. The terminal of claim 1, wherein the control unit is further configured to move the position of the widget application to another separate display unit on the terminal if the caption is determined to be displayed at the position that will overlap with said at least the portion of the displayed widget application.

8. A terminal, comprising:
    a communication unit configured to receive a digital signal including video, audio and data signal;
    a display unit configured to display a video content included in the received digital signal; and
    a control unit configured to determine if at least one widget application is to be displayed on the display unit with the video content, to control the display unit to divide the display unit into first and second display portions, to display the widget application in the first display portion, to adjust the second display portion to have a same aspect ratio of the display unit before the display unit was divided into the first and second portions, and to display the video content in the second display portion such that the video content and the widget application do not overlap each other,
    wherein when the control unit displaying the video content in the second display portion to have the same aspect ratio includes unused margins, the control unit is further configured to increase a size of the displayed video content to cover the unused margins while maintaining the same aspect ratio, to display a first portion of the displayed video content as partially overlapping with the first display region, and to cut a second portion of the displayed video content so the video content covers the unused margins.

9. The terminal of claim 8, wherein the control unit is further configured to adjust the aspect ratio of the second display portion to a ratio of 16:9 if the digital signal is a High-Definition (HD) broadcasting signal.

10. The terminal of claim 8, wherein the control unit is further configured to adjust the aspect ratio of the second display portion to a ratio of 4:3 if the digital signal is an analog broadcasting signal.

11. A method of controlling a terminal, the method comprising:
    receiving, via a communication unit on the terminal, a digital signal including video, audio and data signal;
    displaying, via a display unit on the terminal, a video content included in the received digital signal and at least one widget application; and
    determining, via a control unit on the terminal, if the received digital signal includes a caption related to the video content, and if the caption is to be displayed at a position that will overlap with at least a portion of the displayed widget application when the caption is included in the digital signal; and
    moving, via the control unit controlling the display unit, a position of the widget application on the display unit if the caption is determined to be displayed at the position that will overlap with said at least the portion of the displayed widget application,
    wherein the moving step moves the widget application such that the widget application does not overlap with the caption, and
    wherein the method further includes dividing the display unit into first and second display portions, displaying the widget application in the first display portion, and adjusting the second display portion to have a same aspect ratio of the display unit before the display unit was divided into the first and second portions, and to display the video content in the second display portion.

12. The method of claim 11, wherein the digital signal further includes information representing the position that the caption is to be displayed on the display unit.

13. The method of claim 11, wherein the determining step determines the caption is to be displayed at the position that will overlap with said at least the portion of the displayed widget application, if a color change of a predetermined range occurs at the position of the displayed widget application.

14. The method of claim 11, wherein the moving step moves the widget application to a previous position of the widget application after the caption is removed from being displayed.

15. The method of claim 11, further comprising:
    changing, via the control unit controlling the display unit, a transparency of the widget application if the determining step determines the caption is to be displayed at the position that will overlap with said at least the portion of the displayed widget.

16. The method of claim 11, wherein the adjusting step adjusts the aspect ratio of the second display portion to a ratio of 16:9 if the digital signal is a High-Definition (HD) broadcasting signal.

17. The method of claim 11, wherein the adjusting step adjusts the aspect ratio of the second display portion to a ratio of 4:3 if the digital signal is an analog broadcasting signal.

18. The method of claim 11, wherein the moving step moves the position of the widget application to another separate display unit on the terminal if the caption is determined to be displayed at the position that will overlap with said at least the portion of the displayed widget application.

* * * * *